(12) United States Patent

Porras Aguilar

(10) Patent No.: US 12,601,926 B2

(45) Date of Patent: Apr. 14, 2026

(54) QUANTITATIVE PHASE IMAGING WITH NONLINEARLY POLARIZED LIGHT USING A BIREFRINGENT LIQUID CRYSTAL CELL AND RELATED METHODS

(71) Applicant: THE UNIVERSITY OF NORTH CAROLINA AT CHARLOTTE, Charlotte, NC (US)

(72) Inventor: Rosario Guadalupe Porras Aguilar, Concord, NC (US)

(73) Assignee: THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 314 days.

(21) Appl. No.: 18/446,517

(22) Filed: Aug. 9, 2023

(65) Prior Publication Data

US 2024/0053619 A1 Feb. 15, 2024

Related U.S. Application Data

(60) Provisional application No. 63/370,862, filed on Aug. 9, 2022.

(51) Int. Cl.
*G02B 27/28* (2006.01)
*G02B 5/30* (2006.01)
(Continued)

(52) U.S. Cl.
CPC ......... *G02B 27/288* (2013.01); *G02B 5/3016* (2013.01); *G02B 21/14* (2013.01); *G02B 21/36* (2013.01)

(58) Field of Classification Search
CPC ..... G02B 21/14; G02B 21/36; G02B 21/0092
See application file for complete search history.

(56) References Cited

U.S. PATENT DOCUMENTS

| | | | |
|---|---|---|---|
| 6,937,283 B1 * | 8/2005 | Kessler | G02B 5/3083 |
| | | | 348/335 |
| 2011/0149359 A1 * | 6/2011 | Leister | G03H 1/2294 |
| | | | 359/227 |
| 2023/0168482 A1 * | 6/2023 | Liang | G02B 21/0032 |
| | | | 359/386 |

FOREIGN PATENT DOCUMENTS

WO WO-2021226314 A1 * 11/2021 ............. G02B 27/46

OTHER PUBLICATIONS

Alemán-Castaneda, et al., "Shearing interferometry via geometric phase", Optica, 6(4), 2019, 396-399.
(Continued)

*Primary Examiner* — Paul C Lee

(74) *Attorney, Agent, or Firm* — Myers Bigel, P.A.

(57) ABSTRACT

A quantitative phase contrast imaging system comprises a light source configured to generate light and to direct the light to a sample, wherein the light comprises nonlinearly polarized light; a first lens configured to receive light from the sample; a phase filter, wherein the first lens is configured to focus the light from the sample onto the phase filter, and the phase filter is configured to modulate multiple components of the nonlinearly polarized light simultaneously (e.g., geometric phase interferometry); a second lens configured to receive light from the phase filter; and a polarized camera, wherein the second lens is configured to collimate the light beam from the phase filter to the polarized camera and the polarized camera is configured to image the sample in response to the light from the phase filter. In absence of the second lens, the camera can be placed at the image plane.

18 Claims, 13 Drawing Sheets

(51) Int. Cl.
    *G02B 21/14*         (2006.01)
    *G02B 21/36*         (2006.01)

(56)            References Cited

OTHER PUBLICATIONS

Creath, Katherine, "V. Phase-Measurement Interferometry Techniques", Progress in Optics, 26, 1988, 349-393.
Demars, et al., "Single-shot phase calibration of a spatial light modulator using geometric phase interferometry", Applied Optics, 59(13), 2020, D125-D130.
Galeana, et al., "Real-time label-free microscopy with adjustable phase-contrast", Optics Express, 28(19), 2020, 27524-27531.
Mavrona, et al., "Intrinsic and photo-induced properties of high refractive index azobenzene based thin films [Invited]", Optical Materials Express, 8(2), 2018, 420-430.
Popescu, Gabriel, "Quantitative Phase Imaging of Cells and Tissues", McGraw-Hill Education, 2011, (28 pages).
Porras-Aguilar, et al., "Polarization-controlled contrasted images using dye-doped nematic liquid crystals", Optics Express, 17(5), 2009, 3417-3423.

* cited by examiner

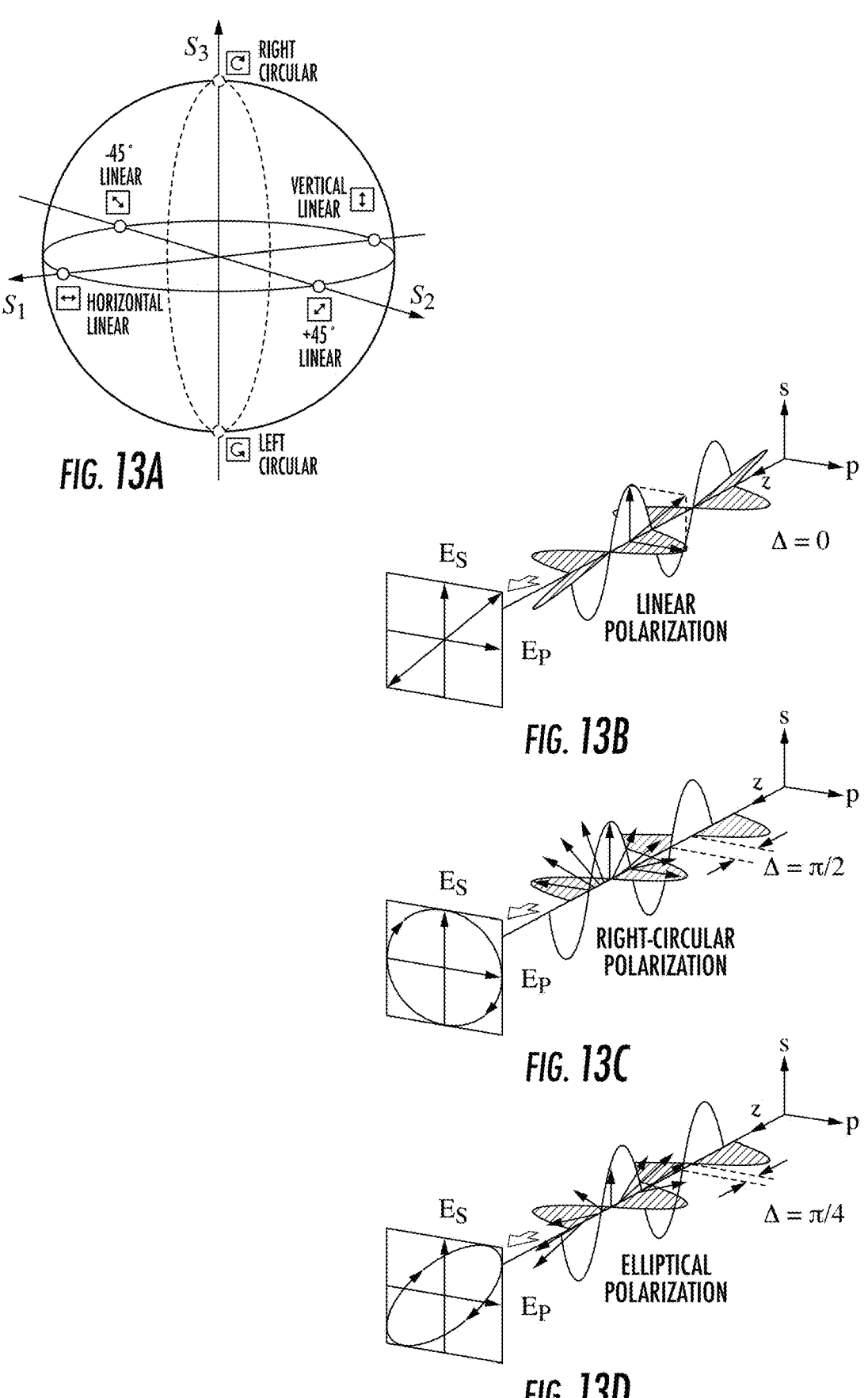
*FIG.* 13A
*FIG.* 13B
*FIG.* 13C
*FIG.* 13D

QUANTITATIVE PHASE IMAGING WITH NONLINEARLY POLARIZED LIGHT USING A BIREFRINGENT LIQUID CRYSTAL CELL AND RELATED METHODS

RELATED APPLICATIONS

This application claims priority from U.S. Provisional Application Ser. No. 63/370,862, filed Aug. 9, 2022, the disclosure of which is incorporated by reference in its entirety.

GOVERNMENT SUPPORT CLAUSE

This invention was made with government support under 2047592 awarded by the National Science Foundation (NSF). The government has certain rights in the invention.

BACKGROUND OF THE INVENTION

Biological specimens are nearly transparent and may be difficult to image because they provide very little amplitude modulation to an illumination light. Various techniques have been developed to image samples such as biological cells, including staining, such as with fluorescent dyes. However, staining techniques may damage living samples and requires a long sample preparation time.

Phase contrast microscopy (PCM) uses the image contrast between diffracted and undiffracted light and enhances the image contrast by shifting the relative phase of the light. After phase shifting, the relative power in an interferogram yields information regarding the shape of the object. That is, a phase-contrast image is produced with an intensity distribution such that the transparent object becomes visible in the image. However, imaging of transparent or translucent objects at low-intensity illumination to avoid damaging cells and reducing halo effects remain challenging.

SUMMARY OF THE INVENTION

According to some embodiments of the present inventive concept, a phase contrast imaging system comprises a light source configured to generate light and to direct the light to a sample, wherein the light comprises nonlinearly polarized light; a first lens configured to receive light from the sample; a phase filter, wherein the first lens is configured to focus the light from the sample onto the phase filter, and the phase filter is configured to modulate the light; a second lens configured to receive light from the phase filter; and a polarized camera, wherein the second lens is configured to direct light from the phase filter to the polarized camera and the polarized camera is configured to image the sample in response to the light from the phase filter.

According to some embodiments of the present inventive concept, a method of quantitative phase contrast imaging comprises generating light and directing the light to a sample, wherein the light comprises nonlinearly polarized light; modulating light from the sample with a phase filter; and imaging the modulated light with a polarized camera to provide a phase contrast image.

BRIEF DESCRIPTION OF THE DRAWINGS

FIG. 13A is a representation of a Poincare Spere that represents all polarization states according to some embodiments.

FIG. 13B is an illustration of linear polarization.

FIG. 13C is an illustration of nonlinear circular polarization.

FIG. 13D is an illustration of nonlinear elliptical polarization.

DETAILED DESCRIPTION

Figure 1:
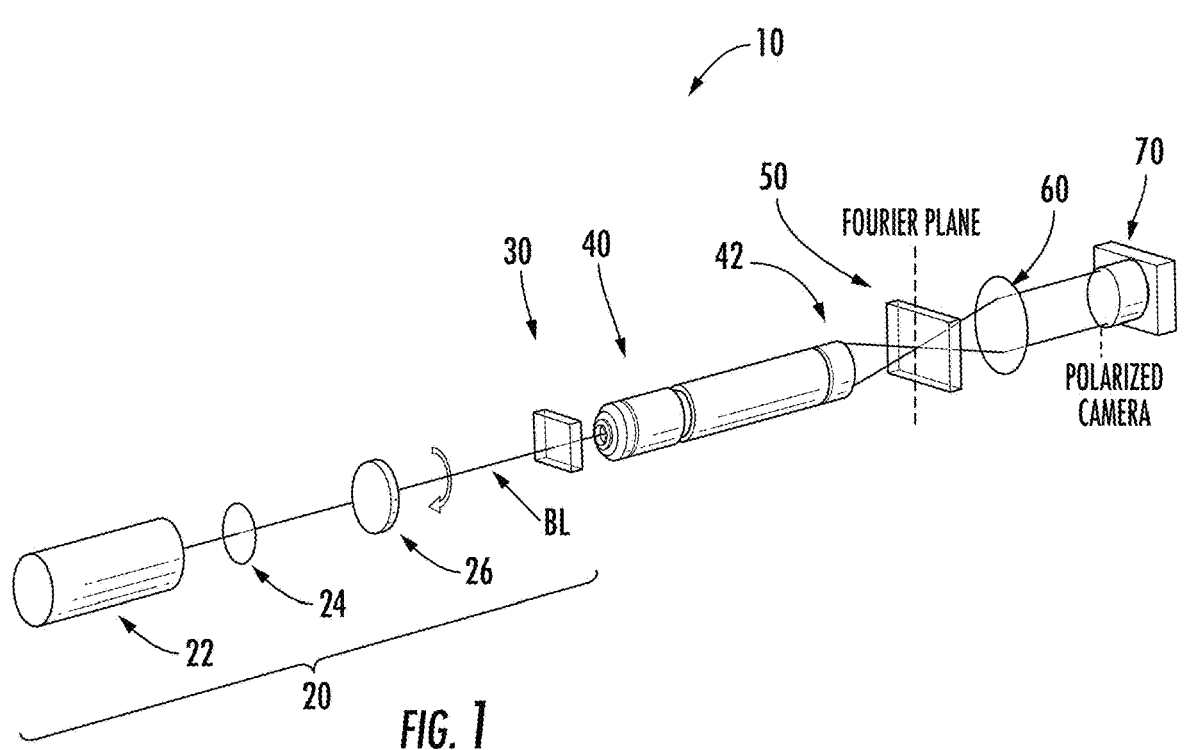
FIG. 1 is a schematic diagram of a phase contrast imaging system according to some embodiments.

The present inventive concept now will be described more fully hereinafter in the following detailed description of the inventive concept, in which some embodiments are described. Indeed, this inventive concept may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the inventive concept. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this inventive concept belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the inventive concept, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the inventive concept and the claims.

In some embodiments of the present inventive concept, label-free, cost-effective quantitative phase imaging (QPI) single shot enabling 4D imaging of transparent or translucent objects is presented. Non-invasive, quasi-real-time 4D visualization of living organisms at low-intensity illumination may be provided in microscopy.

The illumination light may be nonlinearly polarized, e.g., circularly or elliptically polarized, and a lens may direct light from the sample to a Fourier plane. The highest intensity at the Fourier plane may be phase modulated by the nonlinear optical properties of a phase filter, such as liquid crystals (LCs) that create a phase filter for quantitative phase imaging (QPI). The full polarization content interacts with the rest of the LC molecules that, due its optical anisotropy, produces phase-shifted images simultaneously (i.e., geometric phase interferometry). The polarized camera captures four of those phase-shifted images that are processed to enable 3D images with high accuracy in a single shot to provide quasi-real time 4D quantitative phase imaging (QPI).

Embodiments according to the present inventive concept can be implemented in different imaging configurations or attached to imaging devices such as a microscope or a macroscope, or other imaging systems in which the Fourier domain can be accessed, e.g., by adding optical components such as a lens.

As illustrated in FIG. 1, a phase contrast imaging system 10 includes a light source 20, a sample 30, an optical lens or lenses 40, 42 a phase filter 50, an optical lens 60, and a polarization camera 70. The light source 20 is configured to generate nonlinearly polarized light and to transmit the light (BL) to the sample 30. The light passes through the sample 30, which may be a transparent or translucent sample. The lenses 40, 42 receive light from the sample 30 and focus the light from the sample 30 onto the phase filter 50, which modulates the light. The lens 60 receives the modulated light from the phase filter 50 and directs the light from the phase filter 50 to the polarized camera 70.

As illustrated, the light source 20 includes a laser 22, a neutral density (ND) filter 24, and a phase plate 26 configured to adjust the polarization of the light from the laser 22. In this configuration, the neutral density (ND) filter 24 may decrease the intensity of the light from the laser, and the phase plate 26 may adjust the polarization, e.g., to provide nonlinearly polarized light. For example, the phase plate may be a quarter wave plate that provides circularly or elliptically polarized light if the illumination has linear polarization. The laser 22 may be a helium-neon (He—Ne) laser with linear polarization (that uses a waveplate to adjust the polarization to circular or elliptical); however, other suitable light sources include a laser with circular or elliptical polarization, a coherent diode laser with linear polarization (requires a waveplate to convert linear polarization to circular or elliptical polarization) or an illumination source with partial coherence linear polarization (requires a waveplate to adjust to circular or elliptical polarization) or illumination source with partial coherence and circular polarization. The wavelength of the light for the exemplary phase filter material is between 630 to 700 nm, however, the wavelength may be different depending on the material used. The phase filter 50 may be a liquid crystal cell, such as an azobenzene liquid crystal cell or other nonlinear optical materials with an optical anisotropy or birefringence. As illustrated, the sample 30 is illuminated by nonlinearly polarized light, and the image is focused by the lens(es) 40, 42 at the Fourier plane. The phase filter 50 (e.g., an azobenzene liquid crystal cell) is positioned at the Fourier plane, and the image is directed by the lens 60 to the polarized camera 70.

Accordingly, in some embodiments, nonlinearly polarized light (e.g., circularly or elliptically polarized light) may be used as a light source in a phase contrast imaging system. The birefringence of liquid crystal materials (LC) in a liquid crystal cell may be used as a phase filter and positioned at the Fourier plane, and a polarized camera may be used to obtain four phase-shifted images simultaneously using geometric phase imaging and interferometry. See Geometric phase imaging and interferometry as discussed in L. A. Aleman-Castaneda, B. Piccirillo, E. Santamato, L. Marrucci, and M. A. Alonso, "Shearing interferometry via geometric phase," Optica 6, 396 (2019) and L. A. DeMars, M. Mikula-Zdańkowska, K. Falaggis, and R. Porras-Aguilar, "Single-shot phase calibration of a spatial light modulator using geometric phase interferometry," Applied Optics 59, D125 (2020).

Figure 2:
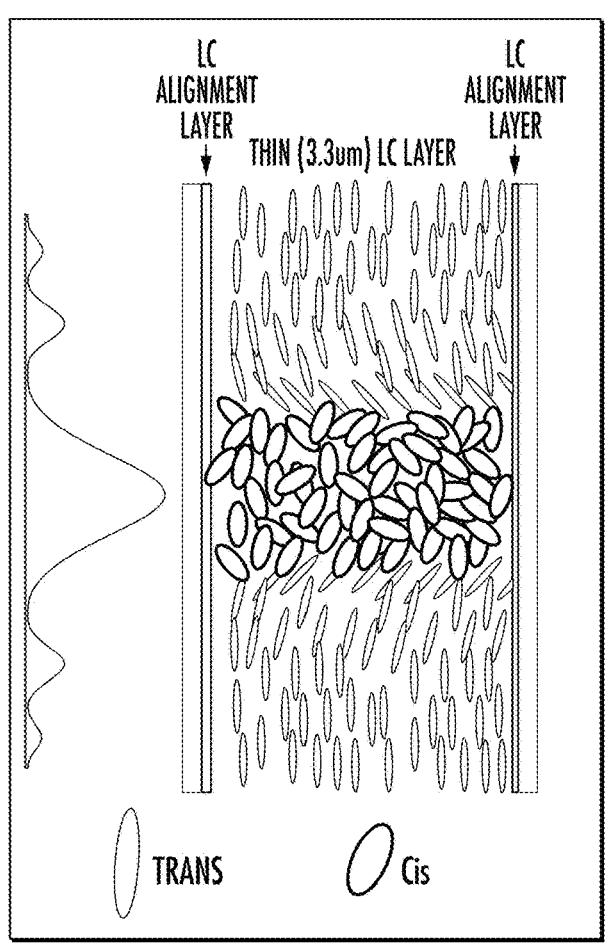
FIG. 2 is a schematic illustration of an example of an azobenzene liquid crystal material in a cell.

A schematic of the liquid crystal cell is illustrated in FIG. 2. The liquid crystal materials LC are in a cell with a cell gap of less than 20 µm. The optical nonlinearity of liquid crystal (LC) materials may be used to self-modulate the undiffracted light at the Fourier plane and obtain a Zernike-like phase filter, as discussed in R. Porras Aguilar, J. C. Ramirez-San-Juan, O. Baldovino-Pantaleon, D. May-Arrioja, M. L. Arroyo Carrasco, M. D. Iturbe-Castillo, D. Sánchez-de-la-Llave, and R. Ramos-Garcia, "Polarization-controlled contrasted images using dye-doped nematic liquid crystals," Optics Express 17, 3417 (2009). The liquid crystal (LC) molecules illuminated by a light beam with a threshold intensity level may undergo photoisomerization. The threshold intensity level at which the liquid crystal (LC) molecules undergo photoisomerization is determined by the nonlinear optical properties of the liquid crystal (LC) materials. Accordingly, the refractive index may be modulated at the highest intensity level, and the liquid crystal cells phase filter width may be selected to reduce or avoid halos in the image of the sample.

The sample 30 may be any transparent or translucent object(s), such as cells, and the imaging system 10 may provide phase contrast images of the sample 30. Other transparent or translucent objects may be liquids or gasses, e.g., a liquid evaporating, airflows due to temperature or density changes. In other words, a transparent/translucent or phase object becomes visible by changing the phase of the light diffracted as the light passes through the object, and the contrast of the image is controlled by polarization. These images are processed to calculate the phase distribution of the object of study.

In some embodiments, azo chemical components in liquid crystal (LC) materials may be used for the liquid crystal cell 50/150 (FIGS. 1 and 3) and as illustrated in the liquid crystal (LC) cell of FIG. 2. One material, in particular, is the azobenzene liquid crystal (LC) that possesses one azo component on each LC molecule, which increases its nonlinearity compared to other liquid crystals and modulates light through the birefringence of its molecules, which enables geometric phase imaging and interferometry. Azobenzene liquid crystals (LCs) are commercially available as azobenzene LC, 4955 by Beam Co., Orlando, Florida, U.S.A. The nonlinear coefficient of the azobenzene LC material is $n2=2.1\times10-1$ cm2/W for 532 nm wavelength, intensity=$4.4\times10-7$ W/cm2, parallel light polarization with respect to the molecular orientation, and cell gap of 10 mm. The LC material was placed in a $25\times21$ mm$^2$ cell with a 3.3 microns gap manufactured by Instec, Inc., Boulder, Colorado, U.S.A. The liquid crystals (LC) cell has a homogeneous alignment such that the liquid crystals (LC) molecules are parallel to the substrate. In this configuration, no voltage or temperature control is required. Besides not requiring the object of interest to be stained (label-free microscopy), the high nonlinearity of azobenzene LC materials allows for the use of very low intensities (about 1 mW/cm2), benefiting biological applications (non-invasive microscopy).

Figure 3:
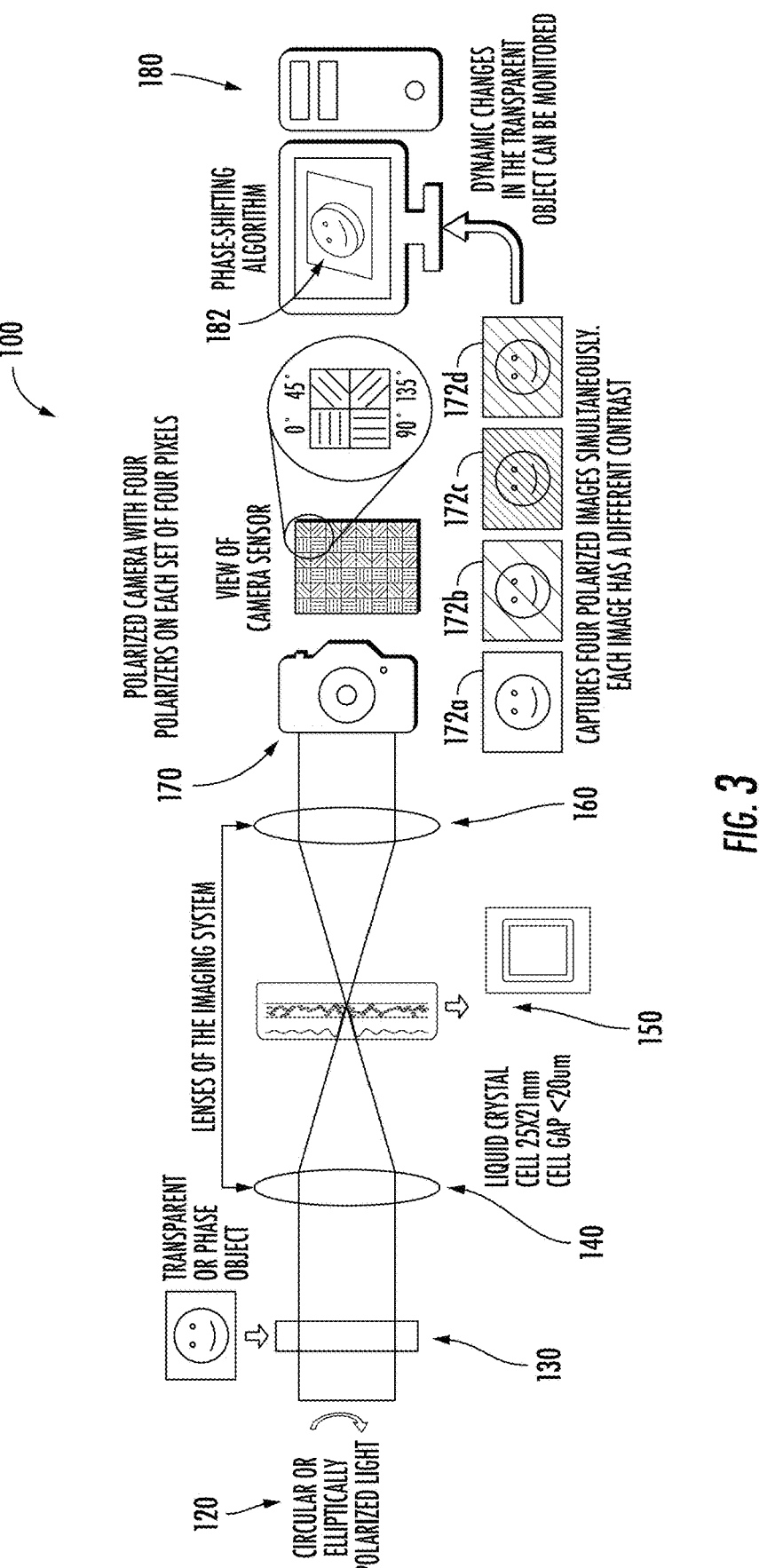
FIG. 3 is a schematic diagram of a phase contrast imaging system according to some embodiments including a polarized camera configured to capture four polarized images having different contrast values simultaneously. example of 4D quantitative phase imaging.

As illustrated in FIG. 3, another example phase contrast imaging system 100 includes a nonlinearly polarized light source 120, a sample 130, a first lens 140 that focuses light from the sample 130 onto the phase filter 150 (e.g., a liquid crystal cell), and a second lens 160 that focuses light from the phase filter 150 onto a polarization camera 170. The polarization camera 170 may communicate data to an imaging computer system 180 with a display 182. The geometric phase modulation from the liquid crystal material in the phase filter 150 combined with the polarized camera may be used to capture a plurality of phase contrast images at different polarizations, for example, four images 172a-172d, simultaneously, as shown in FIG. 3. The four contrasted images 172a-172d are processed by the computer system 180 using a phase-shifting algorithm to display a 3D map of the image on the display 182 using a single shot or image capture of the camera that contains four polarized images that are simultaneously obtained. The four images 172a-172d are used to calculate quantitative phase information for phase images. The camera 170 can capture several sets of polarized images limited by its time response specifications and provide 4D data of the dynamic processes. In other words, the system can monitor changes in the transparent or translucent object in real-time or quasi-real-time.

As shown in FIG. 3, the illumination in the system is circularly or elliptically polarized. After illuminating the object of interest at the sample 130, the image is focused by the first lens 140 at the Fourier plane. The LC material is placed in a liquid crystal (LC) cell, which has a planar alignment and a cell gap of a few microns, to provide the phase filter 150. The liquid crystal (LC) cell phase filter 150 is positioned at the Fourier plane. The light from the sample is phase modulated by propagating through the LC molecules with a uniform linear alignment. However, the highest intensity at the Fourier plane is phase modulated by the nonlinear optical properties of the liquid crystal LC phase filter 150. This effect may create a phase filter for qualitative phase imaging (QPI). The polarization content may interact with the rest of the molecules (geometric phase), creating phase-shifted images. The second lens 160 can be used to capture the images with a polarized camera 170. In some embodiments, the polarized camera 170 is a forward looking (FLIR) camera from Teledyne FLIR LLC in Wilsonville, Oregon, U.S.A., model number BFS-U3-51S5P-C with a pixel size of 3.45 μm×3.45 μm, a resolution of 2448×2048, and dimensions of 8.80 mm×6.60 mm. However, any suitable polarized camera may be used. The polarized camera has a sensor that captures four polarization angles simultaneously. A set of four phase-shifted images 172a-172d is processed using phase-shifting interferometric algorithms to obtain the 3D information in a single shot or image capture at the same time. It should be noted that liquid crystal (LC) cells may have slight differences in molecular alignment. However, a quarter-plate may be used to optimize the polarization direction and calibrate the 4D qualitative phase imaging (QPI) system.

The 4D quantitative phase technology can be adapted to various imaging systems in which the Fourier plane can be accessed, such as microscopy. In some embodiments, an "add-on" or additional module may be added onto or attached to conventional microscopes. For example, as illustrated in FIG. 1, a lens 42 may be used to focus light from a conventional microscope objective onto the liquid crystal (LC) phase filter 50. The light from the phase filter 50 is collimated by the lens 60 into the polarized camera.

Liquid Crystal (LC) Phase Filters

Photoisomerization occurs in azobenzene molecules when light is incident on a material and induces a photoexcited state. When light is incident on the azobenzene molecules, it can cause the trans isomers to switch to cis isomers as illustrated in FIG. 2. However, the cis isomer is unstable and will return to the trans isomer after some period of time. The amount of photoisomerization may be determined by the lifetime of the photoexcited state (the cis isomer in this case) in the molecules, and the response time of the molecules to the stimulus. The response time is a function of the quantum efficiency and absorption constants. The azobenzene molecules have a long photoexcited state and quick response time, which makes them suitable for photoisomerization.

The photoisomerization that occurs in these molecules can also be used to intensify the nonlinear effects of liquid crystals. Azobenzene dye can be added in small amounts to liquid crystals (azobenzene-dye doped liquid crystals) to induce a stronger reorientation of the dipoles in the liquid crystal molecules during photoisomerization of the dye. The torque on the liquid crystal molecules is significantly increased by anchoring cis isomers on the boundaries of the cell through dipole-dipole interactions.

An azobenzene liquid crystal (LC) material may be used, which includes a synthesized molecule that contains an azobenzene and a liquid crystal component. This material exhibits a large optical nonlinearity and optical anisotropy, which makes this material a potential candidate for implementing quantitative phase microscopy. The intensity to illuminate the object may be, for example, reduced two orders of magnitude compared to QPM using azo-dye-doped liquid crystals. In addition, the optical anisotropy of azobenzene liquid crystals (the difference between the principal values of the refractive indices of the LC) is 0.20 at 633 nm wavelength.

The photoisomerization and nonlinear optical effects of azobenzene liquid crystal materials can be exploited to create a self-modulating phase filter at the Fourier plane as illustrated in FIG. 2. A common path configuration is used; however, at the Fourier plane, an azobenzene liquid crystal cell is used as the phase filter. This is an effective phase filter because only the undiffracted light at the Fourier plane will be of high enough intensity to cause photoisomerization in the liquid crystal, thereby acting as a self-modulating phase filter.

Quantitative Phase Microscopy Analysis

Typically, imaging systems will measure only amplitude information. However, quantitative phase microscopy (QPM) is a technique used to gather phase information as well as amplitude information about a transparent or translucent object. This technique can be used to determine the 3D information of a transparent or translucent sample by using optical phase delay information. Quantitative phase microscopy (QPM) is a useful tool for the study of biological samples because it is both non-invasive and label-free, which reduces damage to biological samples.

One technique that can be used to obtain quantitative phase information is the four-step technique. This technique involves using phase shifting to obtain four intensity measurements with a quarter-wave shift between them. This can be written as follows:

$$I_{1(x,y)} = I_O(x, y)\{1 + \gamma \cos (\phi(x, y))\}, \quad (1)$$

$$I_{2(x,y)} = I_O(x, y)\left\{1 + \gamma \cos \left(\phi(x, y) + \frac{\pi}{2}\right)\right\}, \quad (2)$$

$$I_{3(x,y)} = I_O(x, y)\{1 + \gamma \cos (\phi(x, y) + \pi)\}, \quad (3)$$

$$I_{4(x,y)} = I_O(x, y)\left\{1 + \gamma \cos \left(\phi(x, y) + \frac{3\pi}{2}\right)\right\}, \quad (4)$$

where $I_o$ is the DC intensity, $\gamma$ is the modulation of the interference fringes, and $\phi$ is the phase of the wavefront. Using these four measurements, the phase at each point in the image can be calculated using the following equation, $$\phi(x, y) - \tan^{-1}\left(\frac{I_4 - I_2}{I_1 - I_3}\right) \quad (5)$$

Accordingly, in the common path configuration shown in FIG. 3 and the liquid crystal (LC) phase filter of FIG. 2, the undiffracted light will be the greatest in intensity and will change the refractive index of the liquid crystal (LC) via photoisomerization.

In some embodiments, a plurality of different polarizations may be captured simultaneously, e.g., to provide quantitative phase imaging. A polarized camera may be used to capture four (or at least three) different phase contrast images at different phase shifts for geometric phase analysis. In this configuration, improved image resolution may be obtained and/or more accurate phase maps may be generated. In addition, dynamically measured phase information may be obtained in quasi-real time as the different phase contrast images may be simultaneously captured by the polarized camera. In some embodiments, liquid crystal (LC) materials used as a phase filter may increase the contrast in the phase-contrast images and/or phase maps.

Accordingly, nonlinearly polarized light, such as nonlinear elliptically or circularly polarized light may be input to a quantitative phase imaging system to provide an illumination light having a plurality of phase components from the nonlinearly polarized light to illuminate a sample. A birefringent phase filter is configured to modulate multiple components of the nonlinearly polarized light from the sample simultaneously, e.g., to provide geometric phase interferometry. In some embodiments, all components of the light from the sample are modulated by the phase filter. This results in a plurality of different phase-shifted components of light, which may be used to provide an input to a polarized camera. The polarized camera is configured to simultaneously capture a plurality of phase contrast images at the different phase shifts.

Some embodiments will now be described with respect to the following non-limiting examples.

EXAMPLES

An experimental system analogous to that illustrated in FIG. 1 includes a 640 nm, 10 mW Coherent StingRay Laser Diode Module configured to provide the light source, a quarter-wave plate (QWP) positioned in the beam path of the laser diode module to provide circularly or elliptically polarized light, a microscope objective (MO) 40, two positive lenses 42 and 60, an azobenzene liquid crystal (LC) phase filter 50, and the FLIR BFS-U3-51S5P-C camera 70. The LC material is azobenzene LC, 4955 by Beam Co. The nonlinear coefficient of the liquid crystal (LC) material for 532 nm light, with parallel polarization relative to the molecular orientation and a cell gap of 10 mm, is n2=2.1× 10–1 cm2/W. The FLIR camera has a resolution of 2448× 2048 with a pixel pitch of 3.45 μm×3.45 μm. Images include groups of 2×2 pixels called superpixels. Each pixel in the superpixel takes a measurement for a particular polarization angle. The 2448×2048 size image generated by the camera can be separated into four individually polarized images captured simultaneously.

The liquid crystal (LC) is a nonlinear optical material that causes an intensity-dependent phase modulation. Liquid crystal (LC) materials have a specific light intensity threshold that causes a phase transition in the molecules. C. S. Yelleswarapu, S. R. Kothapalli, F. J. Aranda, D. V. G. L. N. Rao, Y. R. Vaillancourt, and B. R. Kimball, "Phase contrast imaging using photothermally induced phase transitions in liquid crystals," Appl Phys Lett, vol. 89, no. 21, 2006, doi: 10.1063/1.2397030. When the intensity is above this threshold value (high-intensity light), the molecules will undergo photoisomerization, which changes the refractive index of the local liquid crystal (LC) molecules. When the intensity is below the threshold value (low-intensity light), no photoisomerization occurs in the local liquid crystal (LC) molecules. This intensity-dependent property of the liquid crystal (LC) can be exploited to produce phase contrast images. L. A. DeMars, M. Mikula-Zdańkowska, K. Falaggis, and R. Porras-Aguilar, "Single-shot phase calibration of a spatial light modulator using geometric phase interferometry," Appl Opt, vol. 59, no. 13, p. D125, 2020, doi: 10.1364/ao.383610 and L. A. Alemán-Castaneda, B. Piccirillo, E. Santamato, L. Marcucci, and M. A. Alonso, "Shearing interferometry via geometric phase," Optica, vol. 6, no. 4, p. 396, 2019, doi:10.1364/optica.6.000396. By placing the liquid crystal (LC) at the Fourier plane, only undiffracted light will be above the intensity threshold and will be phase modulated.

An additional parameter exploited in this experiment is the optical anisotropy of the azobenzene liquid crystal material. For this purpose, the laser is first circularly polarized using a quarter wavelength polarizer QWP. The object of interest (OI) is illuminated by the laser, and its image is magnified by a 20× objective 40 and the first lens 42 (FIG. 1). Then the liquid crystal LC phase filter 50 is placed at the Fourier plane of the image to phase shift the undiffracted light. This optical anisotropy of the liquid crystal (LC) will modulate multiple components (e.g., in some embodiments, all components) of the circularly polarized light resulting in phase contrast images. Subsequently, the second lens 60 collimates the beam and the polarized camera 70 captures four images at four linear stages of polarization (0°, 45°, 90°, and 135°). This results in four polarized images with different contrast that depends on the optical anisotropy and liquid crystal (LC) alignment.

The phase map of the object may be calculated using the following equation, $$\Phi(x, y) = \arctan\left(\frac{I(x, y, 135°) - I(x, y, 45°)}{I(x, y, 0°) - I(x, y, 90°)}\right) \quad (6)$$

where $\Phi$ is the wrapped phase map, and $I(x, y, \#°)$ are the camera images for each angle of polarization. Equation 6 yields a phase map that is wrapped by $2\pi$ and may be unwrapped using the unwrapping algorithm described in J. Martinez-Carranza, K. Falaggis, and T. Kozacki, "Fast and accurate phase-unwrapping algorithm based on the transport of intensity equation," Appl Opt, vol. 56, no. 25, p. 7079, 2017, doi: 10.1364/ao.56.007079. The process of taking an image and unwrapping it can be done relatively quickly to provide nearly real-time 3D information of an OI. Using the FLIR BFSU3-51S5P-C camera with a resolution of 2448×2048, a frame rate of up to 4 frames per second (fps) was achieved.

Once a phase map is obtained and unwrapped, the thickness of the object of interest can be estimated. The accuracy of the system is determined by using phase maps to estimate the thickness of known 16 objects from a quantitative phase target. Height estimates are made by first finding the mean phase value for the background of the image. Then the mean phase value for the object of interest is found. The absolute difference between the phase value for the object of interest and the background can be used, along with the wavelength of light and the refractive index, to estimate the thickness using the following relation, $$\Delta\phi = \frac{\lambda}{2\pi}\Delta nd, \quad (7)$$

where $\Delta\phi$ is the difference between the object of interest phase value and the background phase value, $\lambda$ is the wavelength of light, $\Delta n$ is the difference in refractive index between the object of interest and air, and d is the thickness of the object of interest. Z. F. Phillips and M.

Chen, "Technical Report: Benchmark Technologies Quantitative Phase Target," 2017.

First, a calibration is done on the system to determine its accuracy. A known quantitative phase benchmark is used as the object of interest. The benchmark contains multiple types of target shapes of varying thicknesses. In this experiment, the 350 nm thick, group 6 element 2 of the 1951 USAF resolution test chart is used as the calibration target. The process described above will be used to calculate the quantitative phase information and estimate the thickness. The 350 nm target is used because it provides the largest signal-to-noise ratio in the phase measurement. The target is placed in the apparatus, and the phase information is reconstructed. Then, by comparing the expected phase difference to the experimentally measured phase difference, a correction term may be calculated to remove the systematic error. The correction term is calculated as follows, $$\gamma = \frac{d_{exp}}{d_m} \quad (8)$$

where $\gamma$ is the correction term, $d_{exp}$ is the expected thickness, and $d_m$ is the measured thickness.

After calibration, phase measurements of all the quantitative phase USAF targets, excluding the 350 nm calibration target, were taken to determine the accuracy of the system after calibration. The thicknesses are estimated using Equations 7 and 8 as follows, $$d = \Delta\phi\frac{2\pi}{\lambda\Delta n}\gamma \quad (9)$$

Once the calibration is completed, quantitative phase information is taken for HeLa cells. This measurement illustrates the ability to gather quantitative phase information about a nearly transparent or translucent biological specimen. Then measurements of the thickness of an isopropyl alcohol droplet are taken during evaporation to demonstrate the apparatus' ability to measure quantitative phase information of a dynamic system. Isopropyl alcohol is atomized using a spray bottle and placed on a microscope slide. The alcohol droplets then evaporate over time due to the ambient air temperature.

Figure 4A:
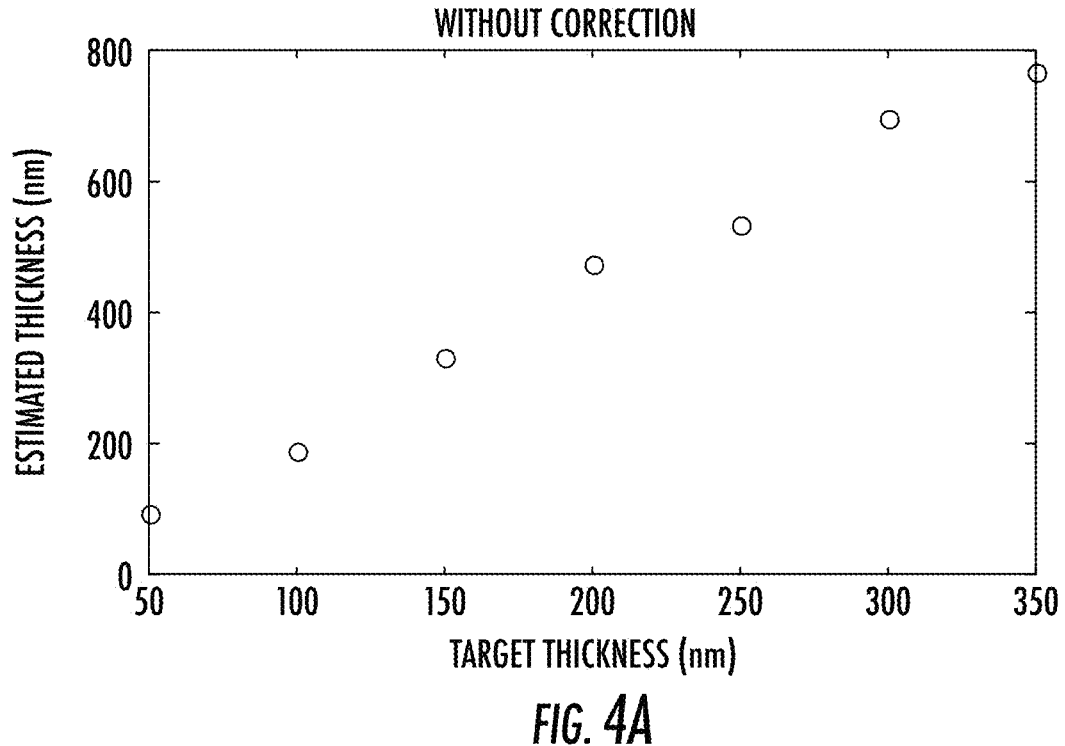
FIGS. 4A-4B are graphs of the target thickness (nm) of an object for seven targets without a correction term (FIG. 4A) and with a correction term (FIG. 4B) calculated using methods according to some embodiments.
Figure 4B:
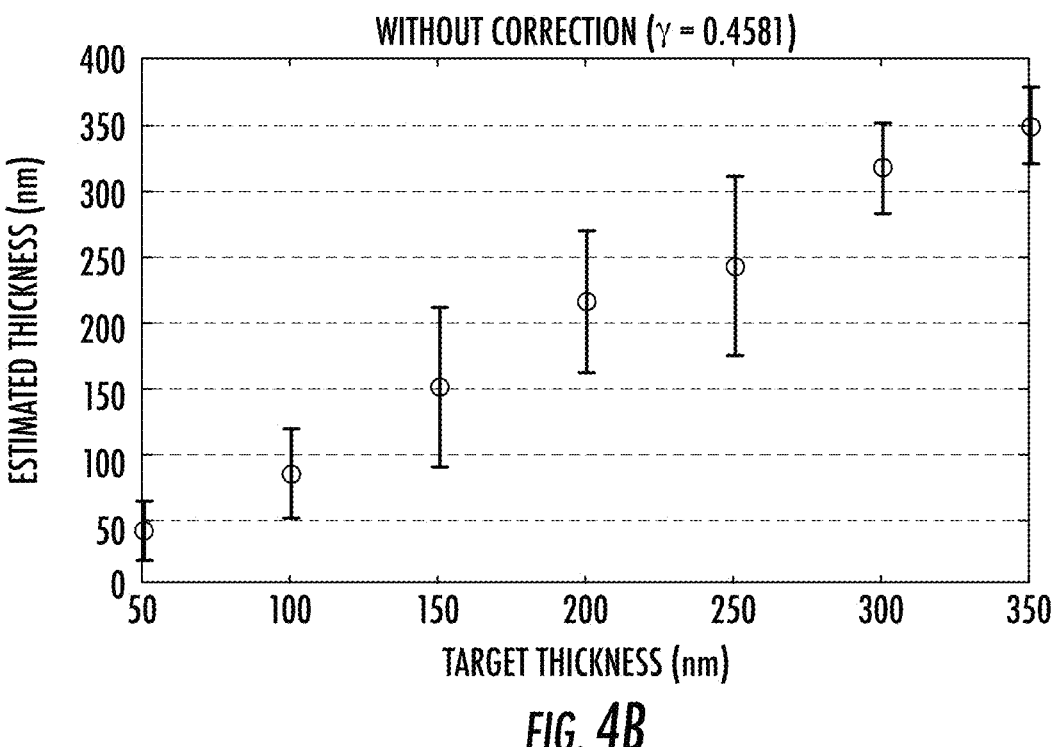

FIG. 4A-4B shows the estimated thicknesses of the benchmark targets before and after calibration. There is a systematic error that causes the estimated thicknesses of each target to be off by about the same magnitude. The 350 nm object was measured to have a thickness of 764 nm. Using Equation 8, the correction term $\gamma$ is calculated to be 0.4581. The seven targets have the following thicknesses: 50 nm, 100 nm, 150 nm, 200 nm, 250 nm, 300 nm, and 350 nm. The estimated thicknesses are (42±22) nm, (85±34) nm, (151±61) nm, (216±54) nm, (243±68) nm, (318±34) nm, and (350±29) nm, respectively. The system estimated the thicknesses within 18 nm across all targets. The mean value of double the standard deviation of the measurements is 86 nm, which compares well with other imaging systems. A 350 nm target was used to calibrate the system; therefore, the estimated thickness for that target is the same as expected.

Figure 5:
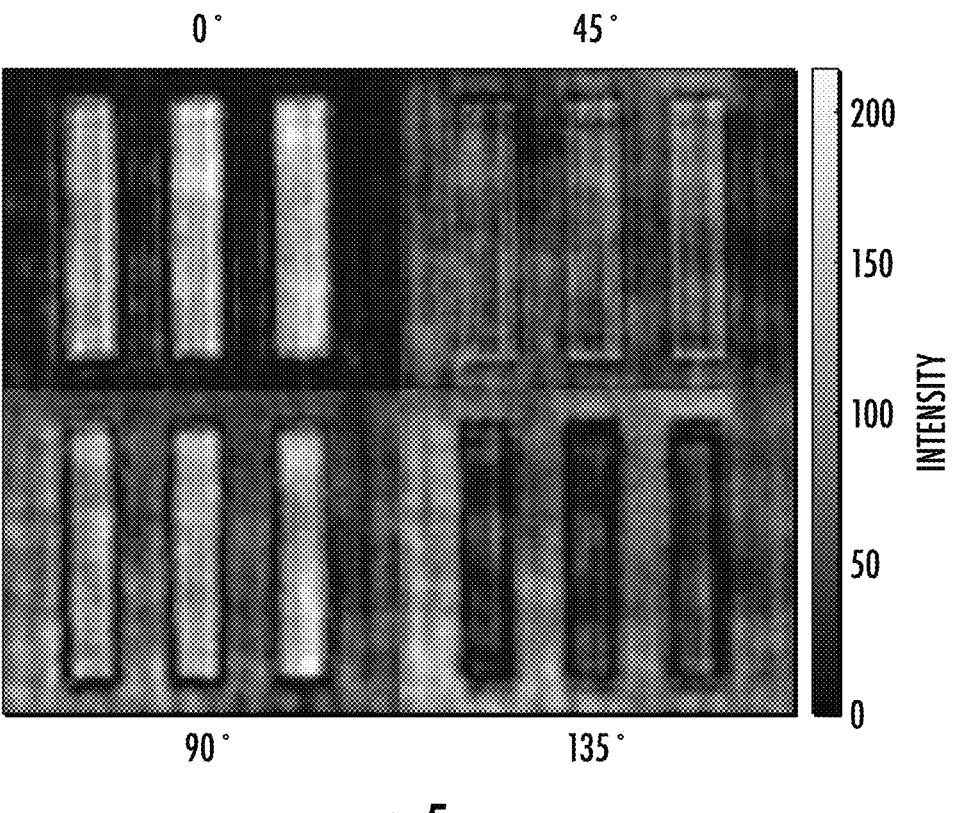
FIG. 5 is a phase contrast image of a group 6 element from the 1951 USAF resolution test chart for a 350 nm quantitative phase target according to some embodiments taken with a polarized camera at 4 angles of polarization.
Figure 6:
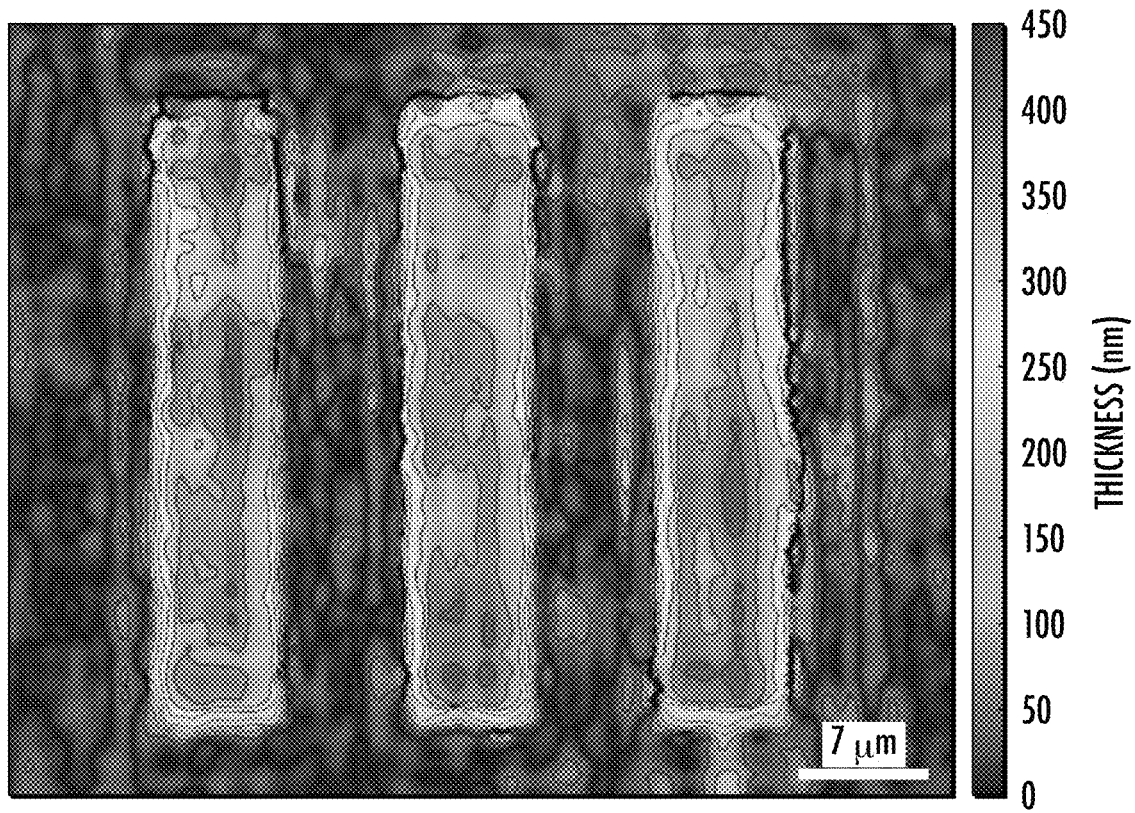
FIG. 6 is an unwrapped phase map according to some embodiments for the 350 nm quantitative phase benchmark in which the width of one bar is about 7 μm and the measurement for the object before calibration is (764±64) nm and (350±29) nm after calibration.
Figure 7:
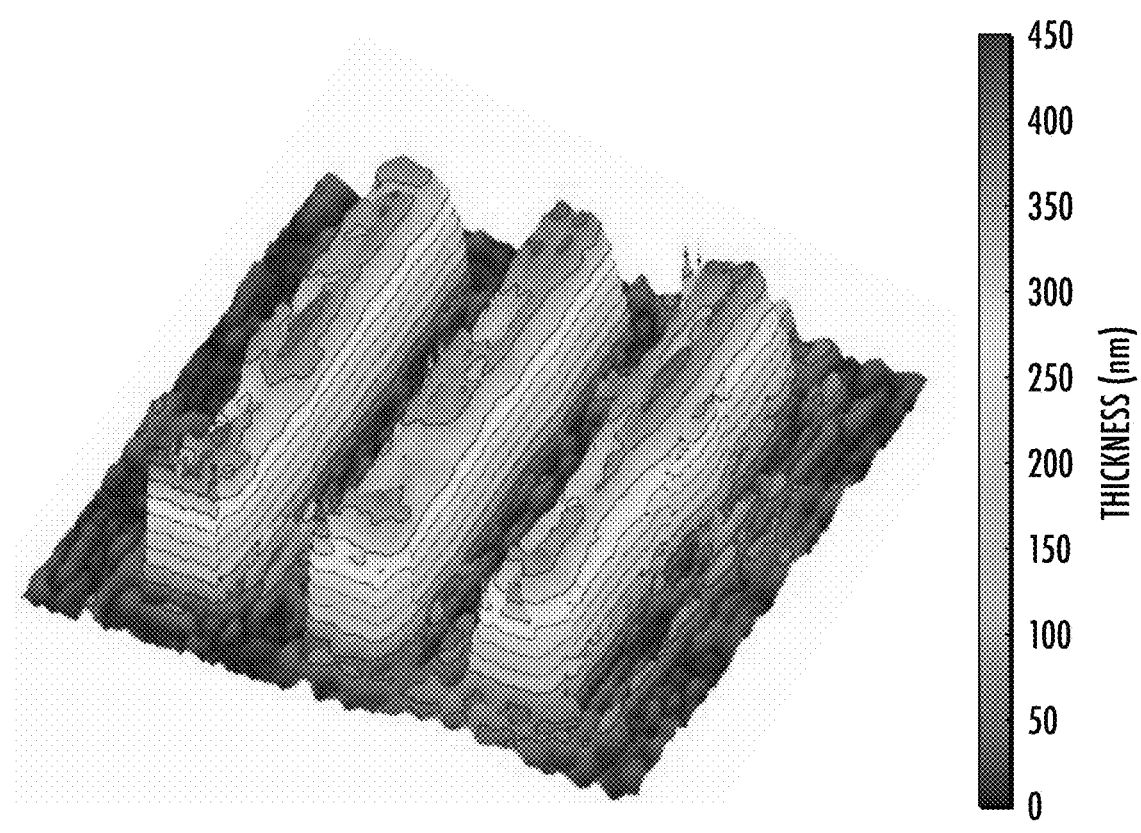
FIG. 7 is an unwrapped phase map for the 350 nm quantitative phase benchmark of FIG. 6 shown as a 3D surface.

FIG. 5 shows the phase-contrast images for the 350 nm quantitative phase benchmark. There is an image for the four angles of polarization, 0°, 45°, 90°, and 135° as needed for the 4-step model. The phase information is then retrieved using Equation 6. The phase information for the 350 nm benchmark is shown in FIG. 6. The width of each bar is approximately 7 μm. The measurement for the change in phase due to the object is (3.9440±0.3284) radians, therefore, using Equation 9, the estimated thickness is (350±29) nm. FIG. 7 shows the phase information as a 3D surface with contour lines for every 50 nm thickness.

Figure 8:
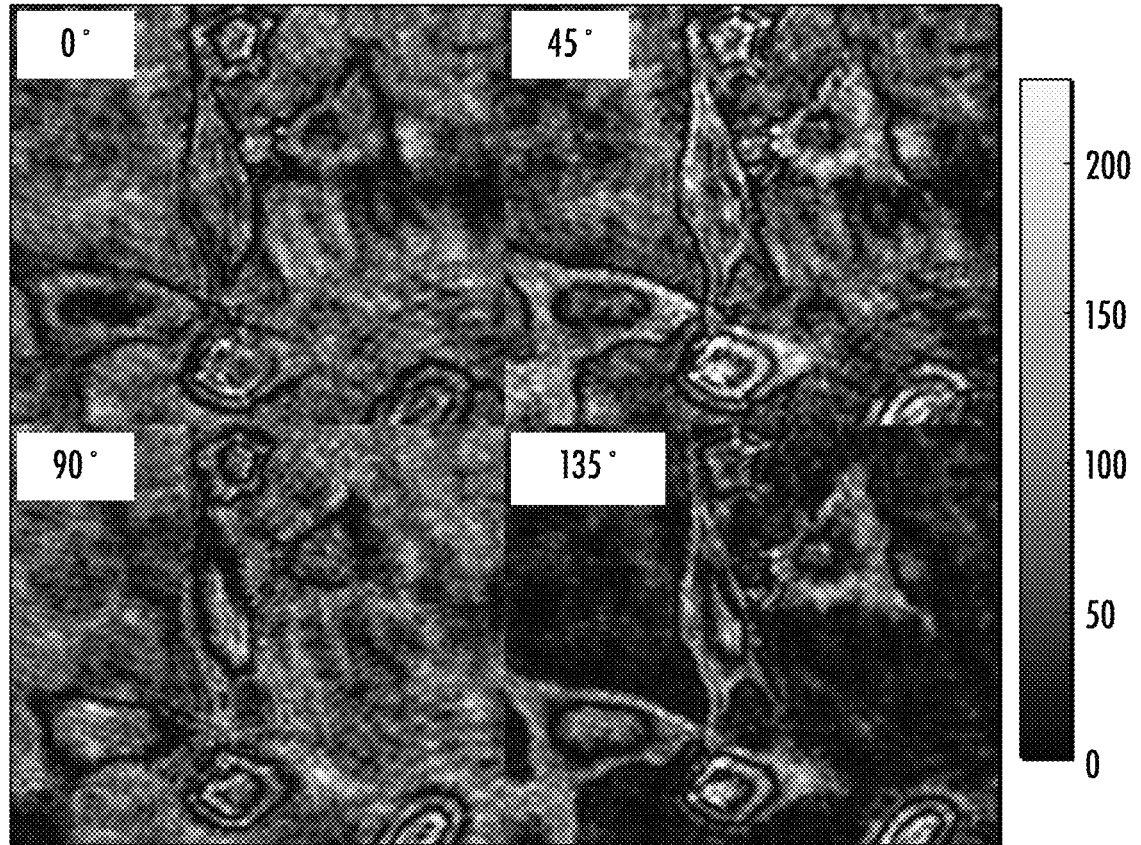
FIG. 8 are phase contrast images of HeLa cells according to some embodiments.
Figure 9:
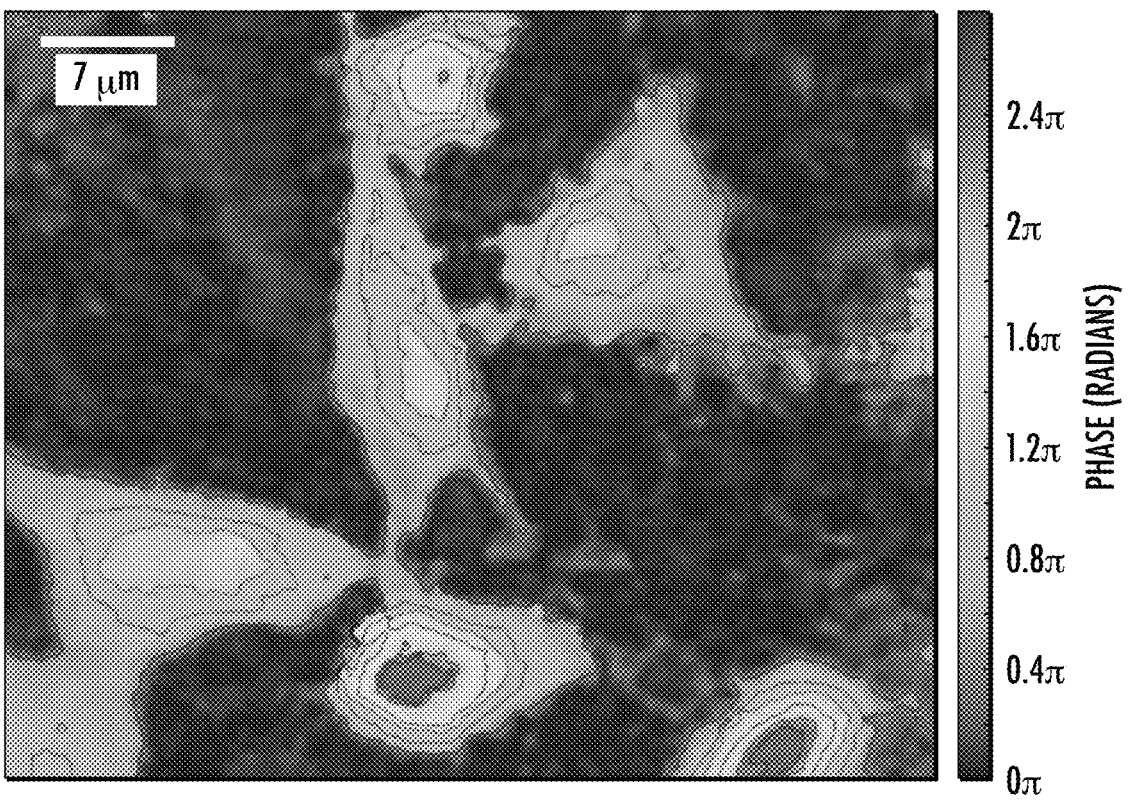
FIG. 9 is an unwrapped phase map according to some embodiments of an image of several HeLa cells where the maximum phase change caused by the cells is about $2.8\pi$ and some of the smaller cells caused approximately $1.2\pi$ to $2\pi$ of phase modulation.
Figure 10:
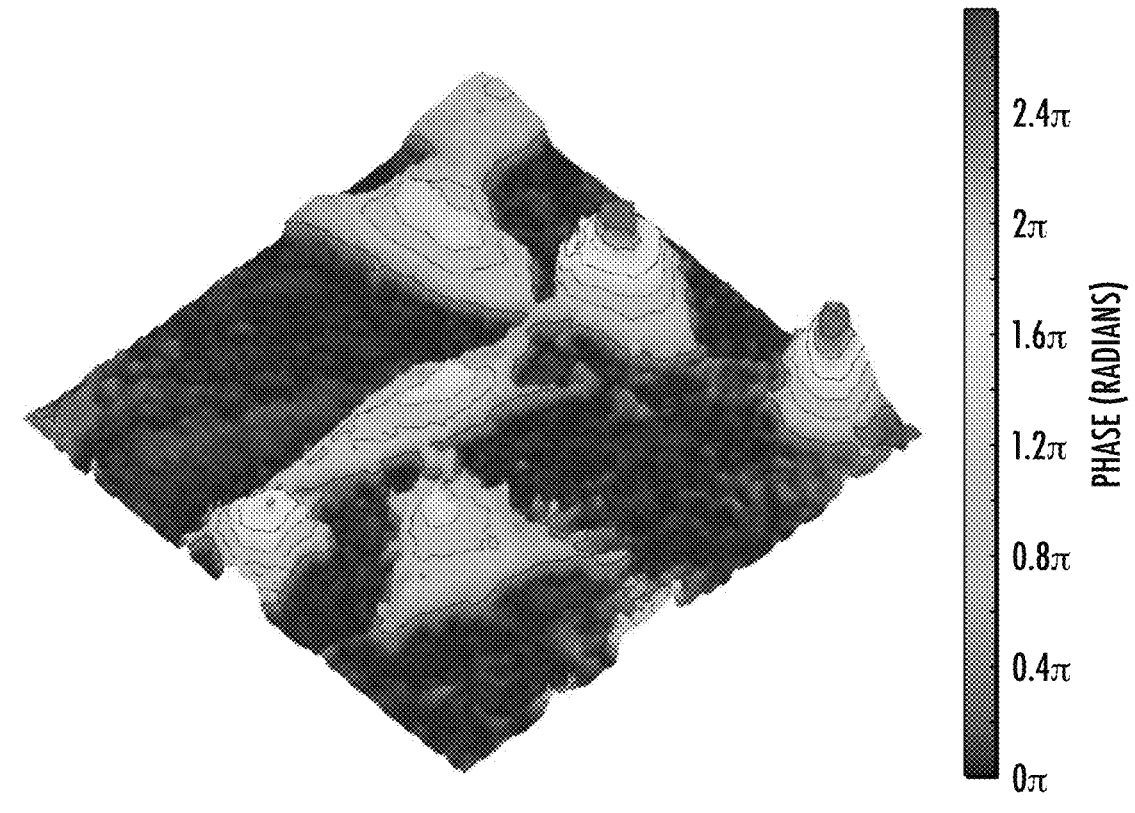
FIG. 10 is a three dimensional surface plot of the HeLa cells of FIG. 9.

FIG. 8 shows the phase-contrast images of the HeLa cells. There is an image for the four angles of polarization, 0°, 45°, 90°, and 135°. Using Equation 6, these phase-contrast images can be used to calculate the phase information of the HeLa cells, as shown in FIG. 9 and FIG. 10. A couple of the cells at the bottom of FIG. 9 induced a phase shift of approximately $2.8\pi$ at the center of the cell where the nucleus is located. The other cells induced a maximum phase shift of approximately $1.2\pi$ to $2\pi$ around their nucleus.

Figure 11:
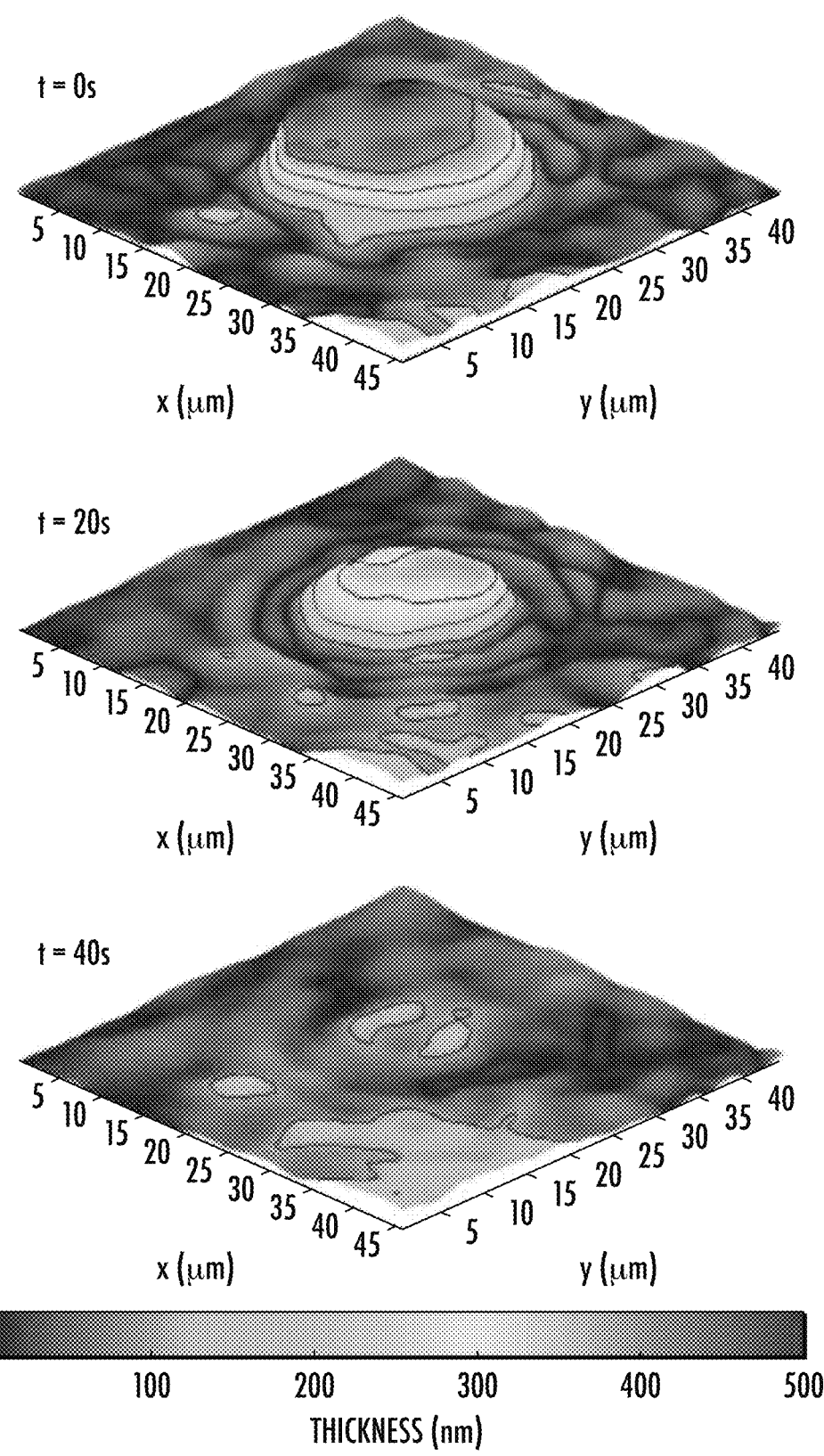
FIG. 11 is a series of surface maps according to some embodiments of an isopropyl alcohol drop evaporating over time where at t=0s, the drop has a thickness of about 425 nm, at t=20, the drop has a thickness of about 300 nm, and at t=40 s, the drop is essentially evaporated.
Figure 12:
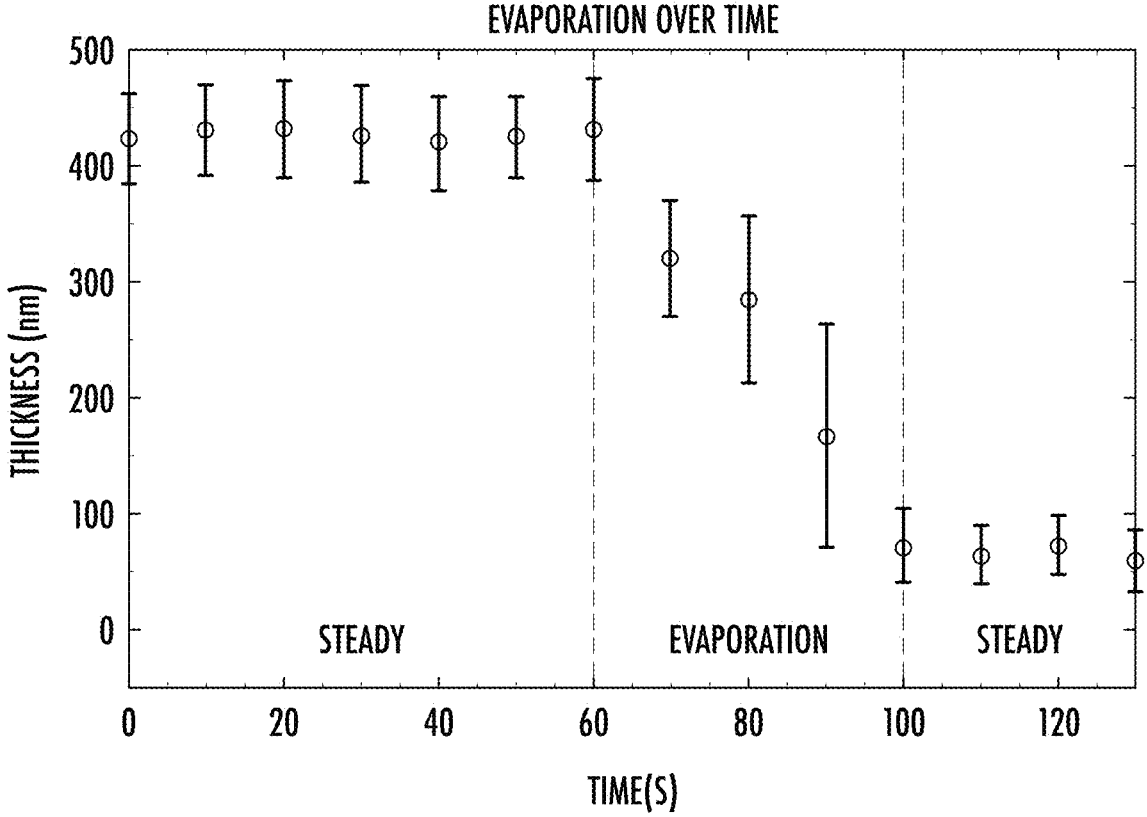
FIG. 12 is a graph of the evaporation of the isopropyl alcohol droplet of FIG. 11 over time.

The 3D phase information of an evaporating isopropyl alcohol droplet is shown in FIG. 10. The thickness of the droplet at t=0 s is approximately 425 nm, and over 40 s the droplet evaporates. At t=20 s the droplets shrink to a thickness of approximately 300 nm. By t=40 s the droplet has completely evaporated. FIG. 12 shows more detailed information about the thickness of the alcohol droplet before, during, and after the evaporation. The images in FIG. 11 were taken during times t=60 s, 80 s, and 100 s from the data in FIG. 12. FIG. 12 shows that the alcohol drop was sitting consistently around 425 nm before the evaporation started at t=60 s. By 24t=100 s the droplet had completely evaporated and the estimated thickness was around 60 nm which is within the noise range of the background phase.

Geometric Phase Calculation

FIG. 13A is a representation of a Poincare Spere that represents all polarization states according to some embodiments. Any other position on the sphere not stated in FIG. 13A represents a degree of elliptical polarization. See Cohen, E., Larocque, H., Bouchard, F. et al. Geometric phase from Aharonov-Bohm to Pancharatnam-Berry and beyond. Nat Rev Phys 1, 437-449 (2019). https://doi.org/10.1038/s42254-019-0071-1 FIG. 13B is an illustration of linear polarization, FIG. 13C is an illustration of nonlinear circular polarization, and FIG. 13D is an illustration of nonlinear elliptical polarization. Circular polarization occurs when the two orthogonal electric vectors are of equal magnitude and are out of phase at 90 degrees or one quarter wavelength. Circular and linear polarization may be considered to be spatial cases of elliptical polarization, and an example of nonlinear elliptical polarization is illustrated in FIG. 13D.

Figures 14A, 14B, 14C:
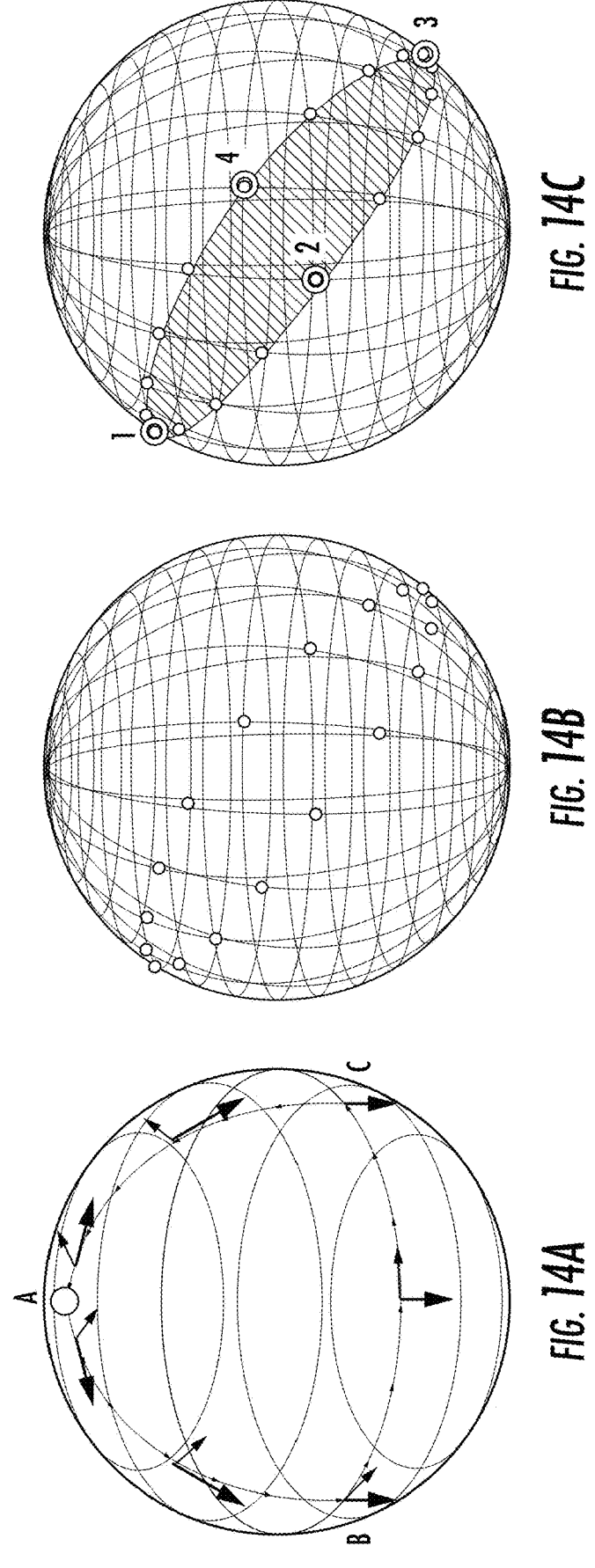
FIG. 14A is a Poincare Sphere illustrating that the geometric phase in optics is a phase difference acquired over a course of a cycle in the Poincare Sphere.
FIG. 14B is an illustration of nineteen values (dots) of polarization measured after a phase filter according to some embodiments.
FIG. 14C is an illustration of four arbitrary polarization values that may be acquired, for example, from a polarized camera to obtain a subtended area that exhibits geometric phase properties.

FIG. 14A is a Poincaré Sphere illustrating a geometric phase in optics that is a phase difference acquired over a course of a cycle in the Poincare Sphere. A Poincaré Sphere is a graphical tool for visualizing different types of polarized light. As shown in FIG. 14A, the area subtended by at least three states of polarization, such as reference letters A, B and C, exhibits geometric phase properties.

FIG. 14B is an illustration of nineteen values (dots) of polarization measured after a phase filter when illuminated with linear polarization values according to some embodiments.

FIG. 14C is an illustration of four arbitrary polarization values that may be acquired, for example, from a polarized camera to obtain a subtended area that exhibits geometric phase properties such as illustrated in FIG. 14A. Note that as few as three arbitrary polarization may be used to obtain the subtended area that exhibits geometric phase properties. The images corresponding to points 1, 2, 3, and 4 in FIG. 14C each have a different phase shift, and therefore, a different contrast. These four images exhibit geometric phase properties because they form a closed area which can be probed using the Pigeonhole principle. See Reference: Grimaldi, Ralph P. (1994), Discrete and Combinatorial Mathematics: An Applied Introduction (3$^{rd}$ ed.), Addison-Wesley, ISBN 978-0-201-54983-6. According to the Pigeonhole principle, one line may be traced between in the sphere and divided into two halves, i.e., points 1 and 2. Accordingly, at least one of the other points is placed in one half of the Poincare Sphere, and hence, the geometric phase may be observed.

In some embodiments, for the specific case of azobenzene liquid crystal (LC), it has been experimentally observed that all points are nearly located along a circumference as shown in FIG. 14B, and therefore, four points will be placed along the circumferences. However, the Pigeonhole principle ensures that at least three points will create a surface that will exhibit geometric phase properties. Therefore, a phase shifting algorithm may be used to calculate the phase of the transparent or translucent object or sample using a single capture from the polarized camera, which detects four images of different polarizations corresponding to the polarizations 1, 2, 3, and 4 of FIG. 14C.

The foregoing is illustrative and is not to be construed as limiting thereof. Although a few exemplary embodiments have been described, those skilled in the art will readily appreciate that many modifications are possible in the exemplary embodiments without materially departing from the novel teachings disclosed. Accordingly, all such modifications are intended to be included within the scope of this invention as defined in the claims. Therefore, it is to be understood that the foregoing is illustrative and the invention set forth in the claims is not to be construed as limited to the specific embodiments disclosed, and that modifications to the disclosed embodiments, as well as other embodiments, are intended to be included within the scope of the appended claims. The invention is thus defined by the following claims, with equivalents of the claims to be included therein.

What is claimed is:

1. A quantitative phase contrast imaging system comprising:
    a light source configured to generate light and to direct the light to a sample, wherein the light comprises nonlinearly polarized light;
    a phase filter configured to phase modulate multiple components of the nonlinearly polarized light;
    a polarized camera configured to image the sample in response to the light from the phase filter,
    wherein the phase filter comprises a birefringent liquid crystal cell, the nonlinearly polarized light is directed from the sample to a Fourier plane, and the birefringent liquid crystal cell is in the Fourier plane,
    wherein a highest intensity light at the Fourier plane is phase modulated by the nonlinear optical properties of the phase filter comprising the birefringent liquid crystal cell to thereby produce phase-shifted images simultaneously.

2. The quantitative phase contrast imaging system of claim 1, wherein the nonlinearly polarized light comprises circularly or elliptically polarized light.

3. The quantitative phase contrast imaging system of claim 1, wherein the liquid crystal cell comprises an azobenzene liquid crystal cell.

4. The quantitative phase contrast imaging system of claim 1, wherein the light source is configured to generate the light at a wavelength of 630 to 700 nm.

5. The quantitative phase contrast imaging system of claim 1, wherein the light source further comprises a light generator configured to generate light and a quarter wave plate between the light generator and the sample that is configured to circularly or elliptically polarize light from the light generator.

6. The quantitative phase contrast imaging system of claim 5, wherein the light generator comprises a laser.

7. The quantitative phase contrast imaging system of claim 1, wherein the sample comprises a biological cell.

8. The quantitative phase contrast imaging system of claim 1, wherein the polarized camera is configured to simultaneously capture a plurality of phase contrast images at different phase shifts.

9. The quantitative phase contrast imaging system of claim 1, further comprising:

a first lens configured to receive light from the sample and to focus the light from the sample onto the phase filter; and a second lens configured to receive light from the phase filter and to direct light from the phase filter to the polarized camera.

10. A method of quantitative phase contrast imaging, the method comprising:

generating light and directing the light to a sample, wherein the light comprises nonlinearly polarized light;

modulating light from the sample with a phase filter;

imaging the modulated light with a polarized camera to provide a phase contrast image wherein the phase filter comprises a birefringent liquid crystal cell, the nonlinearly polarized light is directed from the sample to a Fourier plane, and the birefringent liquid crystal cell is in the Fourier plane, wherein a highest intensity light at the Fourier plane is phase modulated by the nonlinear optical properties of the phase filter comprising the birefringent liquid crystal cell to thereby produce phase-shifted images simultaneously.

11. The method of claim 10, wherein the nonlinearly polarized light comprises circularly or elliptically polarized light.

12. The method of claim 10, wherein the liquid crystal cell comprises an azobenzene liquid crystal cell.

13. The method of claim 10, wherein the phase filter comprises a birefringent phase filter.

14. The method of claim 10, wherein generating light comprises generating the light at a wavelength of 630 to 700 nm.

15. The method of claim 10, wherein generating light comprises directing light through a quarter wave plate to circularly or elliptically polarize light.

16. The method of claim 15, wherein generating light comprises generating light with a laser.

17. The method of claim 10, wherein the sample comprises a biological cell.

18. The method of claim 10, wherein imaging the modulated light with a polarized camera comprises simultaneously capturing a plurality of phase contrast images at different phase shifts with the polarized camera.

\* \* \* \* \*